United States Patent
Suzuki

(10) Patent No.: US 6,208,756 B1
(45) Date of Patent: Mar. 27, 2001

(54) HAND-WRITTEN CHARACTER RECOGNITION DEVICE WITH NOISE REMOVAL

(75) Inventor: Toshio Suzuki, Tokorozawa (JP)

(73) Assignee: Pioneer Electronic Corporation, Tokyo-to (JP)

( * ) Notice: Subject to any disclaimer, the term of this patent is extended or adjusted under 35 U.S.C. 154(b) by 1334 days.

(21) Appl. No.: 08/509,795

(22) Filed: Aug. 1, 1995

Related U.S. Application Data

(63) Continuation of application No. 08/044,397, filed on Apr. 8, 1993, now abandoned.

(30) Foreign Application Priority Data

Apr. 16, 1992 (JP) .................................................. 4-096819

(51) Int. Cl.⁷ ............................................................ G06K 9/36
(52) U.S. Cl. .......................................................... 382/187
(58) Field of Search ..................................... 382/173, 187, 382/190, 201, 202, 210, 293, 254

(56) References Cited

U.S. PATENT DOCUMENTS

| | | | |
|---|---|---|---|
| 4,365,235 | * 12/1982 | Greanias | 382/13 |
| 4,608,658 | * 8/1986 | Ward | 382/254 |
| 4,817,034 | * 3/1989 | Hardin, Sr. et al. | 382/13 |
| 5,023,918 | * 6/1991 | Lipscomb | 382/202 |
| 5,038,382 | * 8/1991 | Lipscomb | 382/13 |

* cited by examiner

*Primary Examiner*—Andrew W. Johns
(74) *Attorney, Agent, or Firm*—Pitney, Hardin, Kipp & Szuch LLP

(57) ABSTRACT

A hand-written character recognition device including: input unit, having input portion, for successively detecting x-y coordinate points of a hand-written character written on the input portion; vector calculation unit for calculating a vector between the detected x-y coordinate points; angle calculation unit for calculating an angle between the vectors calculated by the vector calculation unit; noise identifying unit for analyzing positional variation of the coordinate points on basis of the calculated vectors and the calculated angles, and identifying coordinate points whose positional variation exceed a predetermined variation range as noise coordinate points; and noise removing unit for removing noise coordinate points from the coordinate points detected by the input unit.

8 Claims, 7 Drawing Sheets

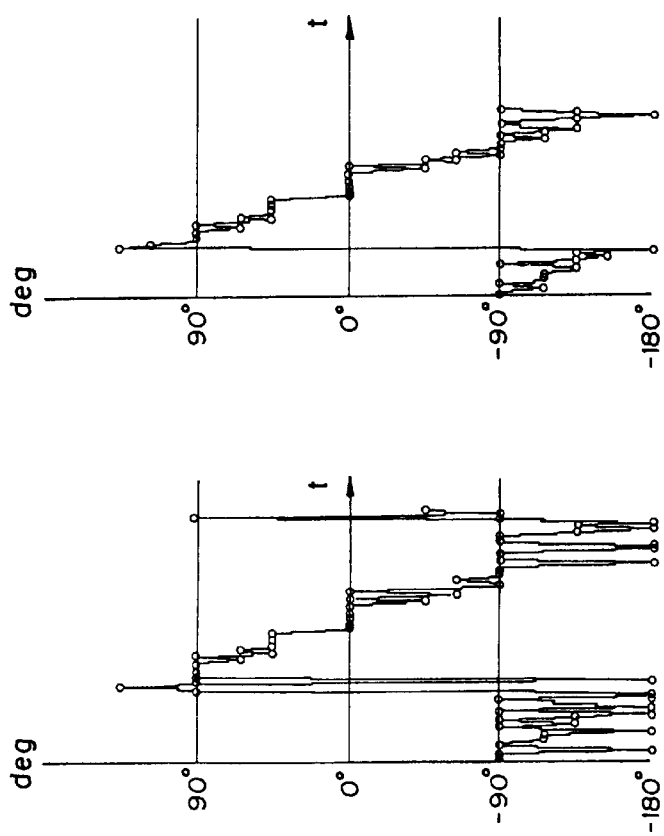

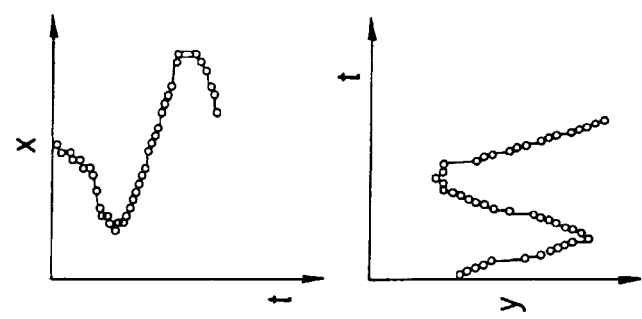
FIG.7(a) TOUCH-PANEL TYPE
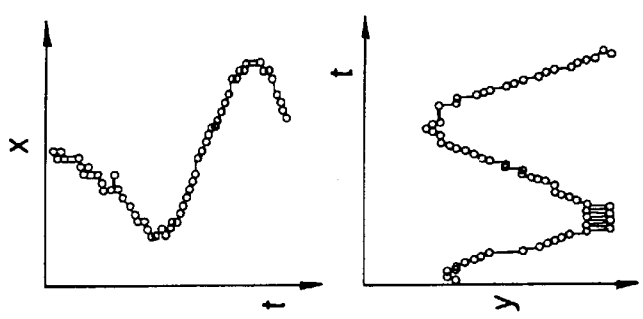
FIG.7(b) TOUCH-PANEL TYPE
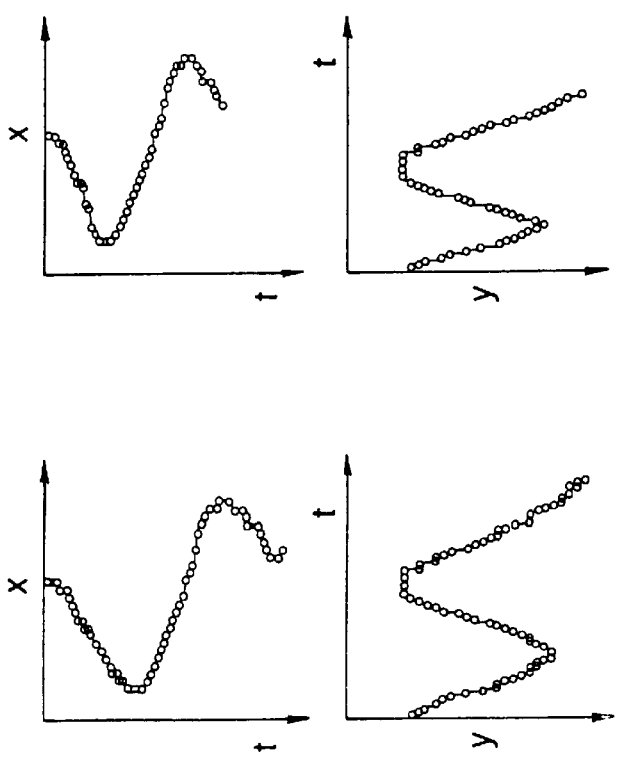
FIG.7(c) POWER-SOURCE INDUCTION TYPE
FIG.7(d) POWER-SOURCE INDUCTION TYPE

HAND-WRITTEN CHARACTER RECOGNITION DEVICE WITH NOISE REMOVAL

This application is a continuation of application Ser. No. 08/044,397, filed Apr. 8, 1993, now abandoned.

BACKGROUND OF THE INVENTION

1. Field of the Invention

This invention relates to a hand-written character recognition device for extracting a feature of a hand-written character written on a tablet on the basis of coordinate data of the written character so as to recognize the character, and more particularly to a hand-written character recognition device having means for removing a noise which appears as a sudden variation of coordinate data written on the tablet.

2. Description of the Prior Art

There is known a hand-written character recognition device which is equipped with a character input device such as a tablet (x-y coordinate input unit) having sensors arranged in a matrix form and extracts a character feature on the basis of x-y coordinate data of a character written on the tablet, thereby recognizing the hand-written character.

FIG. 1 is a block diagram showing the basic construction of the hand-written character recognition device. As shown in FIG. 1, the hand-written character recognition device includes a tablet 100, a pre-processing unit 101, a feature extraction unit 102, and a character recognition unit 103. The tablet 100 has an input portion having a sensor system of one of a touch-panel type sensor which is a pressure-sensitive type sensor using a plane resistor, an electrostatic coupling type sensor or a power source induction type sensor, and serves to output x-y coordinate data of a hand-written character. The pre-processing unit successively receives the x-y coordinate data outputted from the tablet 100 at every predetermined time to define x-y coordinate points of the hand-written character. The feature extraction unit 102 extracts a stroke feature of the inputted character using the data of the x-y coordinate points which has been defined in the pre-processing unit 101. The character recognition unit 103 analyzes the inputted stroke feature obtained by the feature extraction processing in the feature extraction unit 102 so as to recognize the inputted character, and then generates a character code for the inputted character.

In a write operation of a character on the tablet 100, in accordance with the resolution of the tablet and input unit, a plurality of coordinate points would be detected in x and y directions for one data. Therefore, when a plurality of coordinate points are detected for one data, in the pre-processing unit 101, a midpoint of these plurality of coordinate points is calculated so as to define an effective x-y coordinate point of the hand-written character used for the subsequent feature extraction.

However, in such a hand-written character recognition device, especially when a character is written through a finger, a plurality of coordinate points are detected in each of x and y directions. In addition, a write speed and a write pressure are not necessarily constant (that is, the write-in operation is not necessarily stably carried out). Therefore, the calculated x-y coordinate points defined in the pre-processing unit includes some x-y coordinate points deviated from the actual locus of the hand-written character (hereinafter referred to as "noise data" or "noise coordinate point"). The frequent occurrence of the noise data causes the feature extraction processing for the input stroke to be more complicated and unreliable.

SUMMARY OF THE INVENTION

It is an object of the present invention to provide a hand-written character recognition device in which noise data contained in an x-y coordinate data outputted from a tablet is removed, so that a processing load in a feature extraction processing for an input stroke is reduced and thus a more accurate feature extraction can be performed.

According to one aspect of the present invention, there is provided a hand-written character recognition device including: input unit, having input portion, for successively detecting x-y coordinate points of a hand-written character written on the input portion; vector calculation unit for calculating a vector between the detected x-y coordinate points; angle calculation unit for calculating an angle between the vectors calculated by the vector calculation unit; noise identifying unit for analyzing positional variation of the coordinate points on basis of the calculated vectors and the calculated angles, and identifying coordinate points whose positional variation exceed a predetermined variation range as noise coordinate points; and noise removing unit for removing noise coordinate points from the coordinate points detected by the input unit.

The basic technical idea of this invention is based on such an experimental and empirical rule that there is no rapid or sudden variation in the locus of a hand-written character. On the basis of this basic technical idea, the movement of the x-y coordinate data is checked in time-series in the noise removing processing, and those x-y coordinate data rapidly or suddenly varied are removed as noise data. Namely, when the handwritten character recognizing device identifies a coordinate data as a noise coordinate data or not, the device discriminates whether the coordinate data to be judged is within the predetermined variation range which is determined in accordance with a plurality of coordinate points inputted prior to and subsequent to that coordinate data.

Actually, the vector calculation unit successively calculates, for example, a vector between the detected first and second coordinate points, a vector between the detected second and third coordinate points, a vector between the detected first and third coordinate points on the basis of the x-y coordinate data of a hand-written character which are successively detected by the tablet. The angle calculation unit calculates angles between the calculated vectors. The noise identifying unit analyzes the positional relationship between the first, second, third and fourth coordinate points on the basis of the calculated vectors and angles so as to judge whether the second and third coordinate points between the above four coordinate points are varied over a predetermined range or level. If the variation of these coordinate points is over the predetermined range or level, these coordinate points are removed as noise data.

BRIEF DESCRIPTION OF THE DRAWINGS

FIGS. 6(a)–6(d) are graphs of angular representation for vector directions of vectors when the coordinate points of the hand-written character before and after the noise removing processing; and FIGS. 7(a)–7(d) are graphs of time-variation of the positions of the coordinate points of the hand-written character before and after the noise removing processing.

DETAILED DESCRIPTION OF PREFERRED EMBODIMENT

A preferred embodiment according to the present invention will be hereunder described with reference to the accompanying drawings.

Figure 1:
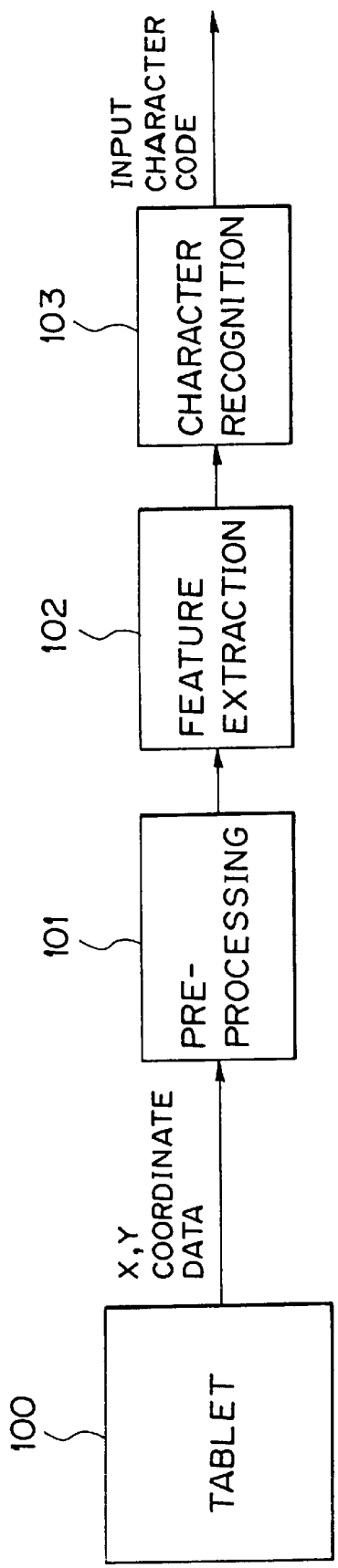
FIG. 1 is a block diagram showing a hand-written character recognition device.
Figure 2:
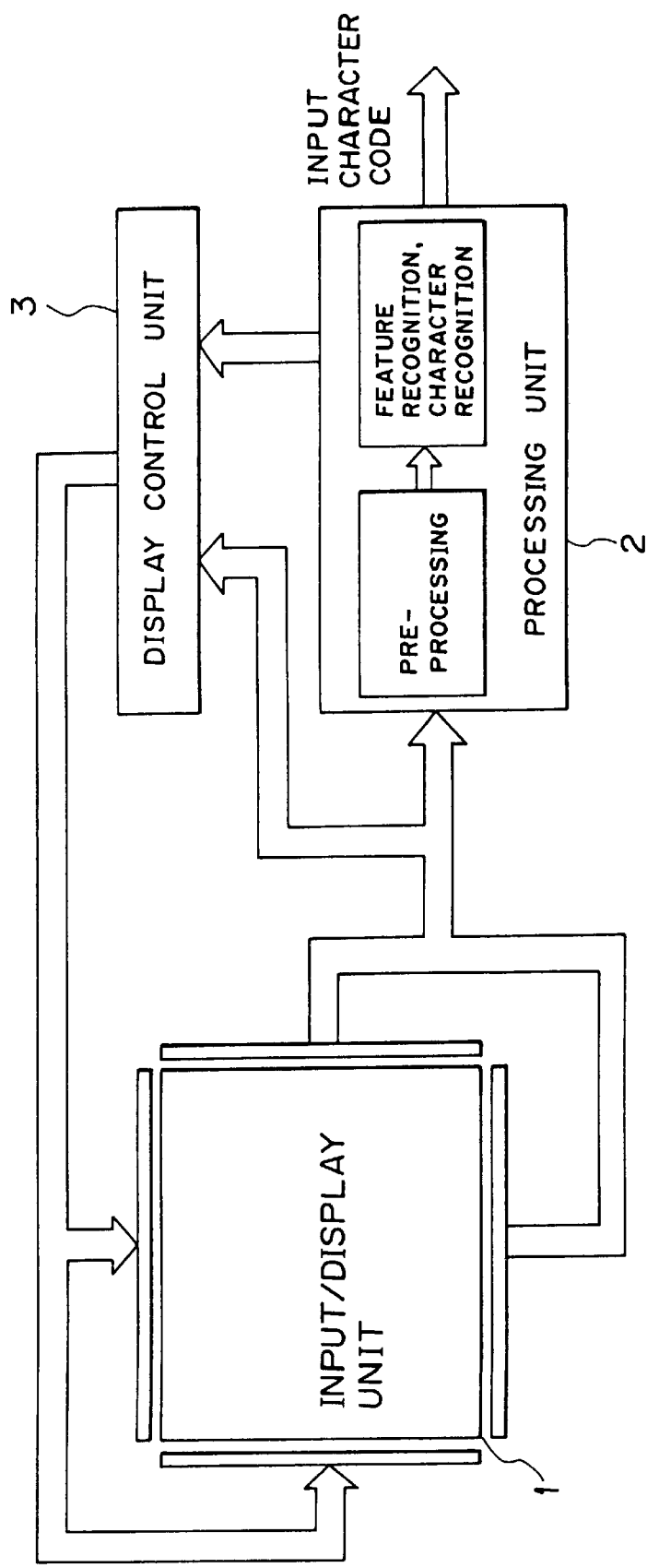
FIG. 2 is a block diagram showing an embodiment of a hand-written character recognition device according to the present invention.

FIG. 2 is a block diagram showing an embodiment of the hand-written character recognition device according to the present invention.

As shown in FIG. 2, the hand-written character recognition device according to this embodiment includes an input/display unit 1, a processing unit 2 and a display control unit 3. The input/display unit 1 includes an input portion formed of a transparent body serving as a tablet, and a display portion disposed under the input portion and having display elements arranged in correspondence with sensors which are arranged in a matrix form in the tablet. The input/display unit 1 serves to output the locus of a hand-written character written on the surface thereof as x-y coordinate points data, and represents a display on the basis of display data outputted from the display control unit 3. This embodiment is described on the assumption that a character is written by a human finger, and thus the sensors of the tablet are disposed at intervals of about 2 mm. Through this input/display unit 1, coordinate point data whose bit number corresponds to the number of sensors of the tablet are outputted for each of x and y directions.

The processing unit 2 is constructed by a microcomputer system, and has a dictionary for identifying characters of fundamental character strokes and characters of combination of the fundamental character strokes. The processing unit 2 successively receives the x-y coordinate data outputted from the input/display unit 1 at every constant time to perform a pre-processing for defining effective x-y coordinate values of the input x-y coordinate data. Then the processing unit 2 extracts features of inputted character strokes using the defined effective x-y coordinate data, selects fundamental character strokes corresponding to the extracted feature of inputted character strokes, and then identifies a character on the basis of combination of the selected fundamental character strokes. The identified character is outputted as a character code to an external, and also fed to the display control unit 3 to be displayed as a defined input character.

The display control unit 3 is supplied with the x-y coordinate data outputted from the input/display unit 1 and controls the display elements corresponding to the coordinate data to display the hand-written character. In addition, the display control unit 3 is equipped with a character font and controls the display elements to display a character code outputted from the processing unit 2 at a predetermined position of the input/display unit 1 as a recognized input character.

Figure 3:
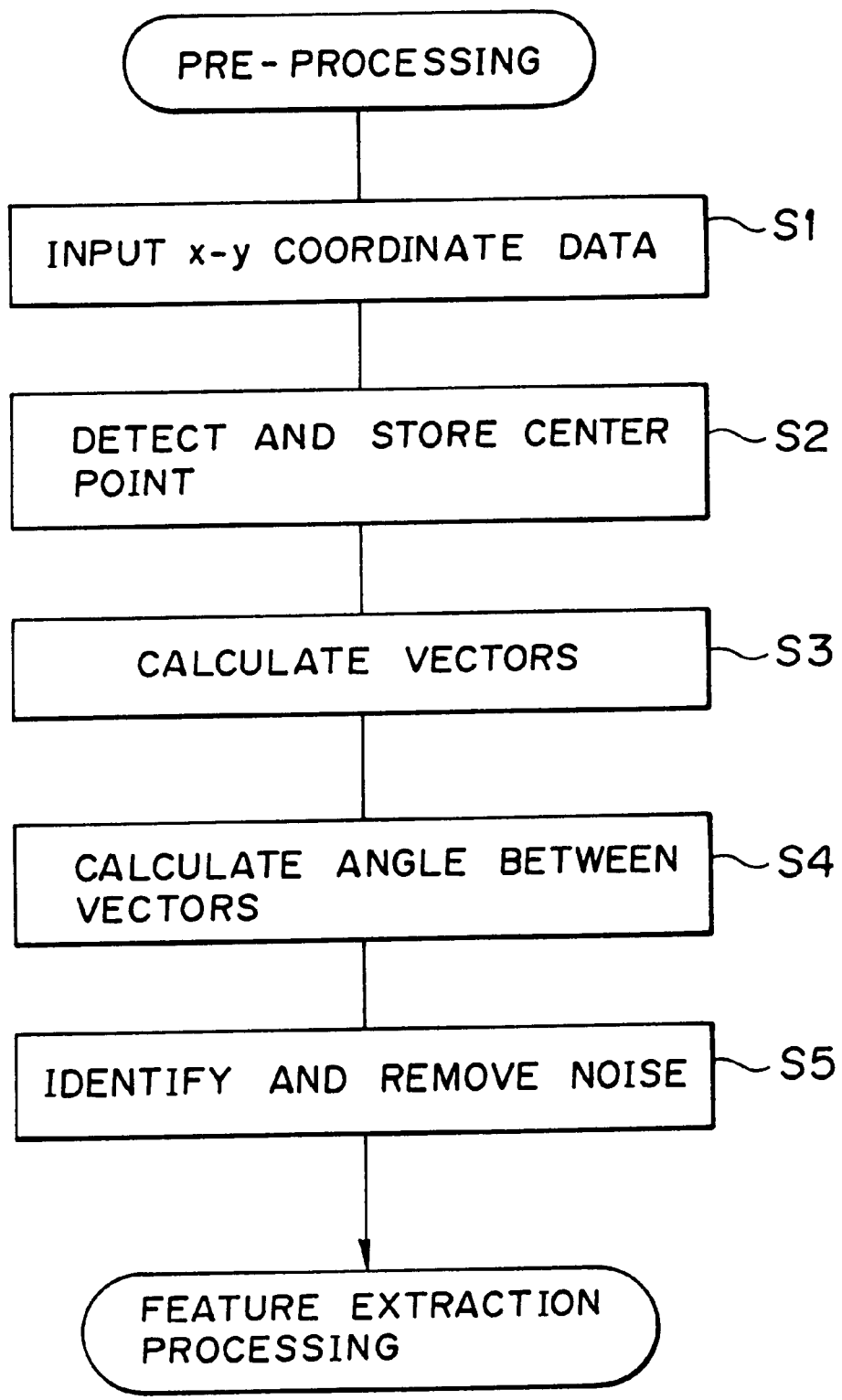
FIG. 3 is a flowchart of a pre-processing in a processing unit of the embodiment.

FIG. 3 is a flowchart showing a pre-processing in the processing unit 2 as described above. The pre-processing of this embodiment will be described in detail with reference to the flowchart of FIG. 3.

First, the x-y coordinate data outputted from the input/display unit 1 is inputted at every constant time in step S1. Here, the input data includes x data and y data whose bit numbers correspond to resolution of the input/display unit 1. Subsequently, each of the input x and y data is checked. If position information of a hand-written character includes plural bits, a center point of the plural bits is calculated to define an x-y coordinate data, and then the data is stored in step S2. Subsequently, a vector is calculated from the stored x-y coordinate data in step S3, and then an angle of the vector is calculated in step S4. Then, a noise coordinate data is identified on the basis of the calculated vector and the angle, and the noise coordinate data is removed in step S5.

Next, the vector calculation processing, the angle calculation processing and the noise identifying and removing processing will be described in detail with reference to FIG. 4.

Figure 4A:
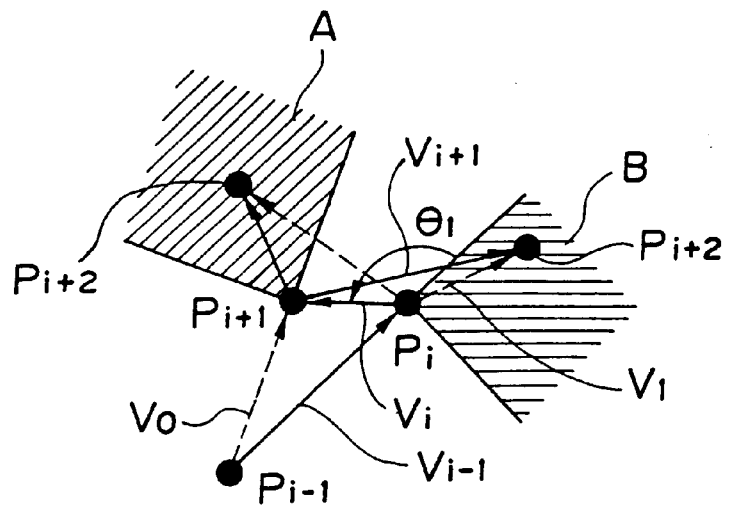
FIGS. 4(a) and 4(b) are schematic views showing the pre-processing in the processing unit of the embodiment.

In FIG. 4, black points P (●) represent coordinate points corresponding to the defined coordinate data of a hand-written character. In FIG. 4(a), the coordinate data are inputted in an order of $P_{i-1}$, $P_i$, $P_{i+1}$ and $P_{i+2}$. Two coordinate points $P_{i+2}$ are illustrated because the operation of noise removing processing becomes different in accordance with the fact that the coordinate point $P_{i+2}$ is located in an area A indicated by an oblique line or in an area B indicated by an oblique line. At the time when these four sequential x-y coordinate data are inputted, following vectors connecting the coordinate points is calculated as a vector calculation processing in the following manner.

$$V_{i-1}=P_i-P_{i-1}$$

$$V_i=P_{i+1}-P_i$$

$$V_{i+1}=P_{i+2}-P_{i+1}$$

$$B_0=P_{i+1}-P_{i-1}$$

$$V_1=P_{i+2}-P_i$$

The area A is defined by an extension line of the vector $V_0$ and a line perpendicular to the extension line and starting at the coordinate point $P_{i+1}$. The area B is defined by an extension line of the vector $V_{i-1}$ and a line perpendicular to the extension line and starting at the coordinate point $P^i$.

Subsequently, as the angle calculation processing of the vector, an angle $\theta_1$ between the vector $V_{i-1}$ and the vector $V_i$ is calculated as follows.

$$\theta_1 = \theta_{vi} - \theta_{vi-1}$$

Next, as the noise identifying and removing processing, the coordinate data whose calculated angle $\theta_1$ satisfies each of the following conditions are identified as noise coordinate data in the following manner, and then they are removed.

(1) When $|\theta_1| = 180°$:

1) if $\|V_{i-1}\| \neq \|V_i\|$, the coordinate point $P_i$ is removed as noise coordinate data.

2) if $\|V_{i-1}\| = \|V_i\|$, the coordinate points $P_i$ and $P_{i+1}$ are removed as noise coordinate data.

(2) When $90° \leq |\theta_1| < 180°$:

1) if $0° < \theta_{Vi+1} - \theta_{VO} < 90°$, that is, if the coordinate point $P_{i+2}$ is located in the area A, the coordinate point $P_i$ is removed as noise coordinate data.

2) if $-90° < \theta_{Vi} - \theta_{Vi-1} \leq 0°$, that is, if the coordinate Points $P_{i+2}$ is located in the area B, the coordinate point $P_{i+1}$ is removed as noise coordinate data.

3) For other cases, the coordinate points $P_i$ and $P_{i+1}$ are removed as noise coordinate data.

(3) When $0° \leq |\theta_1| < 90°$

Figure 4B:
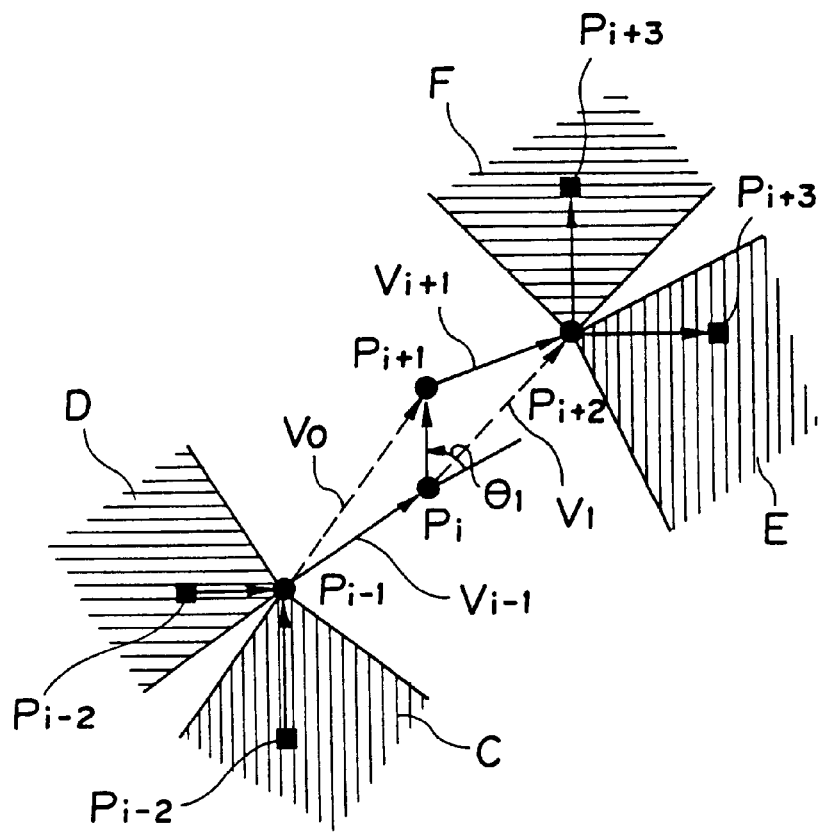

This case will be described with reference to FIG. 4(b). In FIG. 4(b), black points $P_{i-2}$ (■) are coordinate points just prior to the coordinate point $P_{i+1}$. Two coordinate points $P_{i-2}$ are illustrated because the operation of noise removing processing becomes different in accordance with the fact that the coordinate point $P_{i-2}$ is located in an area C indicated by an oblique line or in an area D indicated by an oblique line. Black points $P_{i+3}$ (■) are coordinate points just subsequent to the coordinate $P_{i+2}$. Two coordinate points $P_{i+3}$ are illustrated because the operation of noise removing processing becomes different in accordance with the fact that the coordinate point $P_{i+3}$ is located in an area E indicated by an oblique line or in an area F indicated by an oblique line. The noise removal in this case is carried out as follows.

1) If the coordinate point $P_{i-2}$ is located in the area C and the coordinate point $P_{i+3}$ is located in the, area E, the coordinate point $P_i$ is removed as noise coordinate data.

2) If the coordinate point $P_{i-2}$ is located in the area D and the coordinate point $P_{i+3}$ is located in the area F, the coordinate point $P_{i+1}$ is removed as noise coordinate data.

3) For the other cases, the coordinate points $P_i$ and $P_{i+1}$ are removed as noise coordinate data.

By the above described operation, the noise identifying and removing processing for one coordinate point is completed. Subsequently, the same processing is repeated for next four coordinate points $P_i$ to $P_{i+3}$ (for $P_{i+2}$ to $P_{i+5}$ if $P_i$ and $P_{i+1}$ are removed). The remaining coordinate points which have not been removed in this processing are defined as effective x-y coordinate data of the hand-written character, and they are used in the subsequent feature extraction processing as effective coordinate data.

In the feature extraction processing, one stroke is identified on the basis of the effective x-y coordinate data and the feature extraction therefor is carried out. As described above, in the pre-processing, the processing unit 2 first calculates the center points of the coordinate data inputted from the input unit 1, and then the noise coordinate data is removed so that the subsequent feature extraction is carried out on the basis of only the defined effective coordinates data.

Figures 5A, 5B, 5C, 5D:
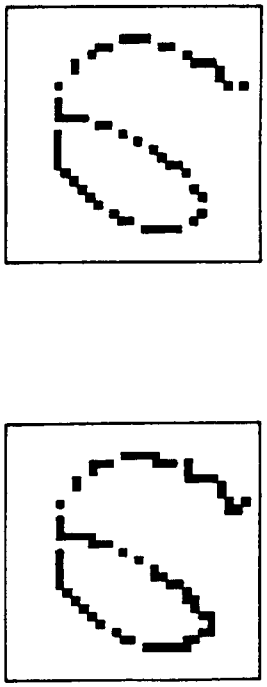
FIGS. 5(a)–5(d) are explanatory diagrams showing examples of movement of coordinate points of a hand-written character before and after a noise removing processing.

FIGS. 5 to 7 show processing results for a Japanese character "の" before and after the noise removing processing. FIG. 5(a), FIG. 6(a) and FIG. 7(a) and FIG. 5(b), FIG. 6(b) and FIG. 7(b) represent a case where the hand-written character is inputted by a finger using a touch-panel type input unit. FIG. 5(a), FIG. 6(a) and FIG. 7(a) represent the result before the noise removing processing and FIG. 5(b), FIG. 6(b) and FIG. 7(b) represent the result after the noise removing processing. FIG. 5(c), FIG. 6(c) and FIG. 7(c) and FIG. 5(d), FIG. 6(d) and FIG. 7(d) represent a case where the hand-written character is inputted by a finger using a power source induction type input unit. FIG. 5(c), FIG. 6(c) and FIG. 7(c) represent the result before the noise removing processing and FIG. 5(d), FIG. 6(d) and FIG. 7(d) represent the result after the noise removing processing.

FIG. 5(a), FIG. 5(b), FIG. 5(c) and FIG. 5(d) show the movement of the coordinate points. FIG. 6(a), FIG. 6(b), FIG. 6(c) and FIG. 6(d) are graphs of angular representation for vector directions of vectors when the coordinate points of the hand-written character before and after the noise removing processing. In FIG. 6(a), FIG. 6(b), FIG. 6(c) and FIG. 6(d), the ordinate represents the angle and the abscissa represents an input time order (time t). The angular direction is represented so that the right and horizontal direction is "0°", the downward direction is "−90°", the left horizontal direction is "−180°" and the upward direction is "90°". FIG. 7(a), FIG. 7(b), FIG. 7(c) and FIG. 7(d) show the time-variation of the coordinate point of the hand-written character. The abscissa of the graphs at an upper stage represents the position in the x-direction on the input surface while the ordinate represents the time. The ordinate of the graphs at a lower stage represents the position in the y-direction while the abscissa represents the time. From these figures, the movement of the coordinate point in the x and y directions can be recognized.

In comparison between the FIG. 5(a), FIG. 6(a), and FIG. 7(a) and FIG. 5(c), FIG. 6(c), and FIG. 7(c), the noise data appears more frequently in the power source induction type than in the touch-panel type. Further, the noise data appears frequently in the vicinity of a start and an end point, and pole portions. The effect of the noise removable is most clearly recognized in FIG. 6(a), FIG. 6(b), FIG. 6(c) and FIG. 6(d) showing the direction of the vector. In comparisons between 6(a) and 6(b), and between 6(c) and 6(d), it is found out that a number of noise components are removed.

As described above, in the pre-processing of the processing unit 2 according to this embodiment, the vectors of the successively-inputted coordinate points of the hand-written character are calculated, and then the noise coordinate points are removed on the basis of the angles of the calculated vectors. Therefore, in a case where feature points are extracted by symbolizing the strokes in the subsequent feature extraction processing, the symbolizing processing can be simplified.

In the above embodiment, in one noise identifying and removing processing, one or two coordinate points are removed by making an identification on the basis of the four sequential coordinates and the coordinate points prior to and subsequent to these coordinate points. However, this invention is not limited to this manner. For-example, the identification may be made on the basis of a larger number of coordinate points in one noise identifying and removing processing to remove a larger number of coordinate points.

As described above, according to the hand-written character recognition device according to the present invention, the noise data contained in the x-y coordinate data is removed, so that the load in the feature extraction processing for the input strokes can be depressed and the more accurate feature extraction can be performed. Therefore, the character recognition can be also more accurately performed.

What is claimed is:

1. A noise removing circuit for a hand-written character recognition device comprising:

an input unit having an input portion on which a character is written;

detecting means for detecting coordinate points of a character written on said input portion in a written order thereon;

noise candidate specifying means for specifying two noise candidate coordinate points one of which is to be removed as a noise coordinate point, said noise candidate coordinate points being consecutive in the written order;

vector calculation means for calculating vectors between one of the noise candidate coordinate points and coordinate points detected prior to and subsequent to the noise coordinate points in the written order, for each of the noise candidate coordinate points, respectively;

angle calculation means for calculating angles between the vectors calculated for each of the noise candidate coordinate points, respectively;

noise identifying means for analyzing positional variations of the noise candidate coordinate points from the coordinate points written prior to and subsequent to the noise coordinate points on the basis of a direct comparison of the angle calculated for one of the noise candidate coordinate points with the angle calculated for the other noise & candidate coordinate point, and for determining the one of the noise candidate coordinate points whose positional variation is greater than that of the other noise candidate coordinate point as a noise coordinate point; and noise removing means for removing the noise coordinate point determined as the noise coordinate point from the coordinate points detected by said input means.

2. A hand-written character recognition device according to claim 1, wherein said noise identifying means determines for which one of the noise candidate coordinate points the angle is smaller as a noise coordinate point.

3. A hand-written character recognition device according to claim 1, further comprising feature extraction means for extracting a feature of the written character on the basis of the coordinate points, and character recognition means for recognizing the written character on the basis of the result of the feature extraction.

4. A method of removing noise in a system for recognizing hand-written characters comprising the steps of:

receiving a hand-writing of a character via an input portion;

detecting coordinate points of a character written on said input portion in a written order thereon;

specifying two noise candidate coordinate points consecutive in the written order, one of which is to be removed as a noise coordinate point;

calculating vectors between one of the noise candidate coordinate points and coordinate points detected prior to and subsequent to the noise coordinate points in the written order, for each of the noise candidate coordinate points, respectively;

calculating angles between the vectors calculated for each of the noise candidate coordinate points, respectively;

analyzing positional variations of the noise candidate coordinate points from the coordinate points written prior to and subsequent to the noise coordinate points on the basis of a direct comparison of the angle calculated for one of the noise candidate coordinate points with the angle calculated for the other noise candidate coordinate point to determine one of the noise candidate coordinate points whose positional variation is greater than that of the other noise candidate coordinate point as a noise coordinate point; and removing the noise coordinate point determined as the noise coordinate point from the coordinate points detected.

5. A method according to claim 4, wherein said noise identifying step determines for which one of the noise candidate coordinate points the angle is smaller as a noise coordinate point.

6. A method according to claim 4, further comprising the steps of extracting a feature of the written character on the basis of the coordinate points, and recognizing the written character on the basis of the result of the feature extraction.

7. A method of removing noise in a system for recognizing hand-written character comprising the steps of:

(a) receiving hand-writing of a character by an input portion;

(b) detecting coordinate points of the character written on said input portion in an order written thereon;

(c) specifying four coordinate points $P_{i-1}$, $P_i$, $P_{i+1}$ and $P_{i+2}$ consecutive in the written order;

(d) calculating vectors $V_{i-1}$, $V_i$, $V_{i+1}$, $V_0$ and $V_1$ between the coordinate points $P_{i-1}$, $P_i$, $P_{i+1}$ and $P_{i+2}$ as follows:

$$V_{i-1} = P_i - P_{i-1},$$

$$V_i = P_{i+1} - P_i,$$

$$V_{i+1} = P_{i+2} - P_{i+1},$$

$$V_0 = P_{i+1} - P_{i-1},$$

$$V_1 = P_{i+2} - P_i;$$

(e) determining an area A defined by an extension line of the vector $V_0$ and a line perpendicular to the extension line of the vector $V_0$ and starting at the coordinate point $P_{i+1}$, and an area B defined by an extension line of the vector $V_{i-1}$ and a line perpendicular to the extension line of the vector $V_{i-1}$ and starting at the coordinate point $P_i$;

(f) calculating an angle $\Theta_1$ between the vector $V_{i-1}$ and the vector $V_i$, an angle $\Theta_2$ between the vector $V_{i+1}$ and the vector $V_0$ and an angle $\Theta_3$ between the vector $V_1$ and the vector $V_{i-1}$;

(g) removing the coordinate point $P_i$ as noise coordinate point if both of the following conditions are satisfied and the coordinate point $P_{i+2}$ is located in the area A:

$$90° \leq |\Theta_1| < 180°, \text{ and } 0° \leq \Theta_2 < 90°;$$

(h) removing the coordinate point $P_{i+1}$ as noise coordinate point if both of the following conditions are satisfied and the coordinate point $P_{i+2}$ is located in the area B:

$$90° \leq |\Theta_1| < 180°, \text{ and } -90° \leq \Theta_3 \leq 0°; \text{ and}$$

(i) removing the coordinate points $P_i$ and $P_{i+1}$ as noise coordinate points if neither of the coordinate points $P_i$ and $P_{i+1}$ is removed in the above steps (g) and (h) and the following condition is satisfied:

$$90° \leq |\Theta_1| < 180°.$$

8. A method of removing noise in a system for recognizing hand-written character comprising the steps of:

(a) receiving hand-writing of a character by an input portion;

(b) detecting coordinate points of the character written on said input portion in an order written thereon;

(c) specifying six coordinate points $P_{i-2}$, $P_{i-1}$, $P_i$, $P_{i+1}$ and $P_{i+2}$, $P_{i+3}$ consecutive in the written order;

(d) calculating vectors $V_{i-1}$ and $V_i$ between the coordinate points $P_{i-1}$, $P_i$, and $P_{i+1}$ and $P_{i+2}$ as follows:

$$V_{i-1} = P_i - P_{i-1}$$

$$V_i = P_{i+1} - P_i$$

$$V_{i+1} = P_{i+2} - P_{i+1}$$

$$V_0 = P_{i+1} - P_{i-1}$$

$$V_1 = P_{i+2} - P_i;$$

(e) determining an area C defined by an extension line of the vector $V_0$ and a line perpendicular to the extension line of the vector $V_0$ and starting at the coordinate point $P_{i-1}$, an area D defined by an extension line of the vector $V_{i-1}$ and a line perpendicular to the extension line of the vector $V_{i-1}$ and starting at the coordinate point $P_{i-1}$, an area E defined by an extension line of the vector $V_{i+1}$ and a line perpendicular to the extension line of the vector $V_{i+1}$ and starting at the coordinate point $P_{i+2}$, and an area F defined by an extension line of the vector $V_1$ and a line perpendicular to the extension line of the vector $V_1$ and starting at the coordinate point $P_{i+2}$;

(f) calculating an angle $\Theta_1$ between the vector $V_{i-1}$ and the vector $V_i$;

(g) removing the coordinate point $P_i$ as noise coordinate point if the coordinate point $P_{i-2}$ is located in the area C, the coordinate point $P_{i+3}$ is located in the area E and the following condition is satisfied:

$$0° \leq |\Theta_1| < 90°;$$

(h) removing the coordinate point $P_{i+1}$ as noise coordinate point if the coordinate point $P_{i-2}$ is located in the area D, the coordinate point $P_{i+3}$ is located in the area F and the following condition is satisfied:

$$0° \leq |\Theta_1| < 90°; \text{ and}$$

(i) removing the coordinate points $P_i$ and $P_{i+1}$ as noise coordinate points if neither of the coordinate points $P_i$ and $P_{i+1}$ is removed in the above steps (g) and (h) and the following condition is satisfied:

$$0° \leq |\Theta_1| < 90°.$$

* * * * *

UNITED STATES PATENT AND TRADEMARK OFFICE
CERTIFICATE OF CORRECTION

| | |
|---|---|
| PATENT NO. | : 6,208,756 B1 |
| DATED | : March 27, 2001 |
| INVENTOR(S) | : Toshio Suzuki |

It is certified that error appears in the above-identified patent and that said Letters Patent is hereby corrected as shown below:

<u>Title page,</u>
Item [54] HAND WRITTEN CHARACTER RECOGNITION DEVICE

Signed and Sealed this

Sixteenth Day of October, 2001

Attest:

*Nicholas P. Godici*

*Attesting Officer*

NICHOLAS P. GODICI
*Acting Director of the United States Patent and Trademark Office*